(12) United States Patent
Rice

(10) Patent No.: US 7,897,241 B2
(45) Date of Patent: Mar. 1, 2011

(54) COMPOSITE SPACER

(75) Inventor: Edward Claude Rice, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 12/393,593

(22) Filed: Feb. 26, 2009

(65) Prior Publication Data
US 2010/0215901 A1  Aug. 26, 2010

(51) Int. Cl.
*B32B 3/24* (2006.01)
*B82B 1/00* (2006.01)
*B32B 5/08* (2006.01)

(52) U.S. Cl. ............... 428/137; 16/2.1; 16/2.5; 411/546; 411/900; 411/908; 415/213.1; 428/66.6; 428/113; 428/114; 428/119; 428/120; 428/131; 428/292.1; 428/297.4; 428/298.1; 428/299.1; 428/300.4; 428/300.7; 428/301.4; 428/366; 428/367; 428/368; 428/902

(58) Field of Classification Search ......................... None
See application file for complete search history.

(56) References Cited

U.S. PATENT DOCUMENTS

| | | | | |
|---|---|---|---|---|
| 3,490,983 A | * | 1/1970 | Lee ................ | 428/113 |
| 3,495,494 A | * | 2/1970 | Scott ............... | 411/411 |
| 3,610,772 A | * | 10/1971 | Wagle ............. | 416/8 |
| 4,063,847 A | | 12/1977 | Simmons | |
| 4,294,490 A | * | 10/1981 | Woelfel .......... | 301/64.703 |
| 4,425,080 A | | 1/1984 | Stanton et al. | |
| 4,478,544 A | * | 10/1984 | Strand ............. | 411/34 |
| 4,495,231 A | * | 1/1985 | Laskaris et al. | 428/36.1 |
| 4,545,837 A | * | 10/1985 | Wehnert et al. | 156/191 |
| 4,659,268 A | * | 4/1987 | Del Mundo et al. | 411/34 |
| 4,687,394 A | * | 8/1987 | Berecz ............ | 411/361 |
| 4,717,302 A | * | 1/1988 | Adams et al. ... | 411/378 |
| 4,834,932 A | | 5/1989 | Salzman et al. | |
| 4,966,802 A | * | 10/1990 | Hertzberg ....... | 428/119 |
| 5,079,055 A | * | 1/1992 | Doyle ............. | 428/36.2 |
| 5,171,041 A | | 12/1992 | McMillan et al. | |
| 5,292,215 A | * | 3/1994 | Roberts, III .... | 411/424 |
| 5,554,430 A | * | 9/1996 | Pollatta et al. . | 428/113 |
| 5,564,874 A | * | 10/1996 | Agatonovic ..... | 411/424 |
| 5,591,524 A | * | 1/1997 | Pohn et al. ..... | 428/367 |
| 5,728,445 A | * | 3/1998 | Murakami et al. | 428/113 |
| 5,958,578 A | * | 9/1999 | Blohowiak et al. | 428/336 |
| 6,029,547 A | | 2/2000 | Eggert et al. | |
| 6,176,663 B1 | * | 1/2001 | Nguyen et al. . | 411/368 |

(Continued)

OTHER PUBLICATIONS

Michael Mullaney, Inexpensive 'nanoglue' can bond nearly anything together, May 16, 2007, News from RPI.*

*Primary Examiner* — D. Lawrence Tarazano
*Assistant Examiner* — Jeff A Vonch
(74) *Attorney, Agent, or Firm* — Ray Meiers; Meiers Law Office LLC

(57) ABSTRACT

A composite spacer operable to be mounted on a first component is disclosed herein, wherein compression loads associated with attaching the first component to some other structure are born by the composite spacer to limit compressive deformation of the first component. The composite spacer includes a first body formed of resin and defining an aperture extending along an axis. The composite spacer also includes a plurality of first fibers positioned in the first body about the aperture. Each of the first fibers extends substantially parallel to the axis and increases a compressive strength of the first body relative to the axial direction.

2 Claims, 3 Drawing Sheets

U.S. PATENT DOCUMENTS

| | | |
|---|---|---|
| 6,484,749 B1 | 11/2002 | Lim et al. |
| 6,719,865 B2 * | 4/2004 | Kasahara et al. ............. 156/184 |
| 6,895,207 B2 | 5/2005 | Kataoka et al. |
| 7,056,053 B2 * | 6/2006 | Schilling et al. ............. 403/337 |
| 7,409,988 B2 | 8/2008 | Borden et al. |
| 7,452,156 B2 | 11/2008 | Kennedy |
| 7,721,495 B2 * | 5/2010 | Kismarton ................ 52/309.16 |

* cited by examiner

COMPOSITE SPACER

BACKGROUND OF THE INVENTION

1. Field of the Invention

The invention relates to a spacer for limiting the compression of a first body being pressed against a second body.

2. Description of Related Prior Art

Two flanges can be bolted together by inserting bolts through bolt holes provided in each of the flanges. The bolt holes of one flange are aligned with the bolt holes of the other flange and the bolt can pass through a hole in each flange. The connection between the two flanges can experience large radial, tangential, or axial loads during operation. Turbine engines are one example of an operating environment in which circumferential flanges experience relatively high loading. It can be desirable in such operating environments to connect two flanges with numerous bolts and to tighten each bolt with a relatively high level of torque.

SUMMARY OF THE INVENTION

In summary, the invention disclosed herein through an exemplary embodiment is a composite spacer operable to be mounted on a first component, wherein compression loads associated with attaching the first component to some other structure are born by the composite spacer to limit compressive deformation of the first component. The composite spacer includes a first body formed of resin and defining an aperture extending along an axis. The composite spacer also includes a plurality of first fibers positioned in the first body about the aperture. Each of the first fibers extends substantially parallel to the axis and increases a compressive strength of the first body relative to the axial direction.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EXEMPLARY EMBODIMENT

Figure 1:
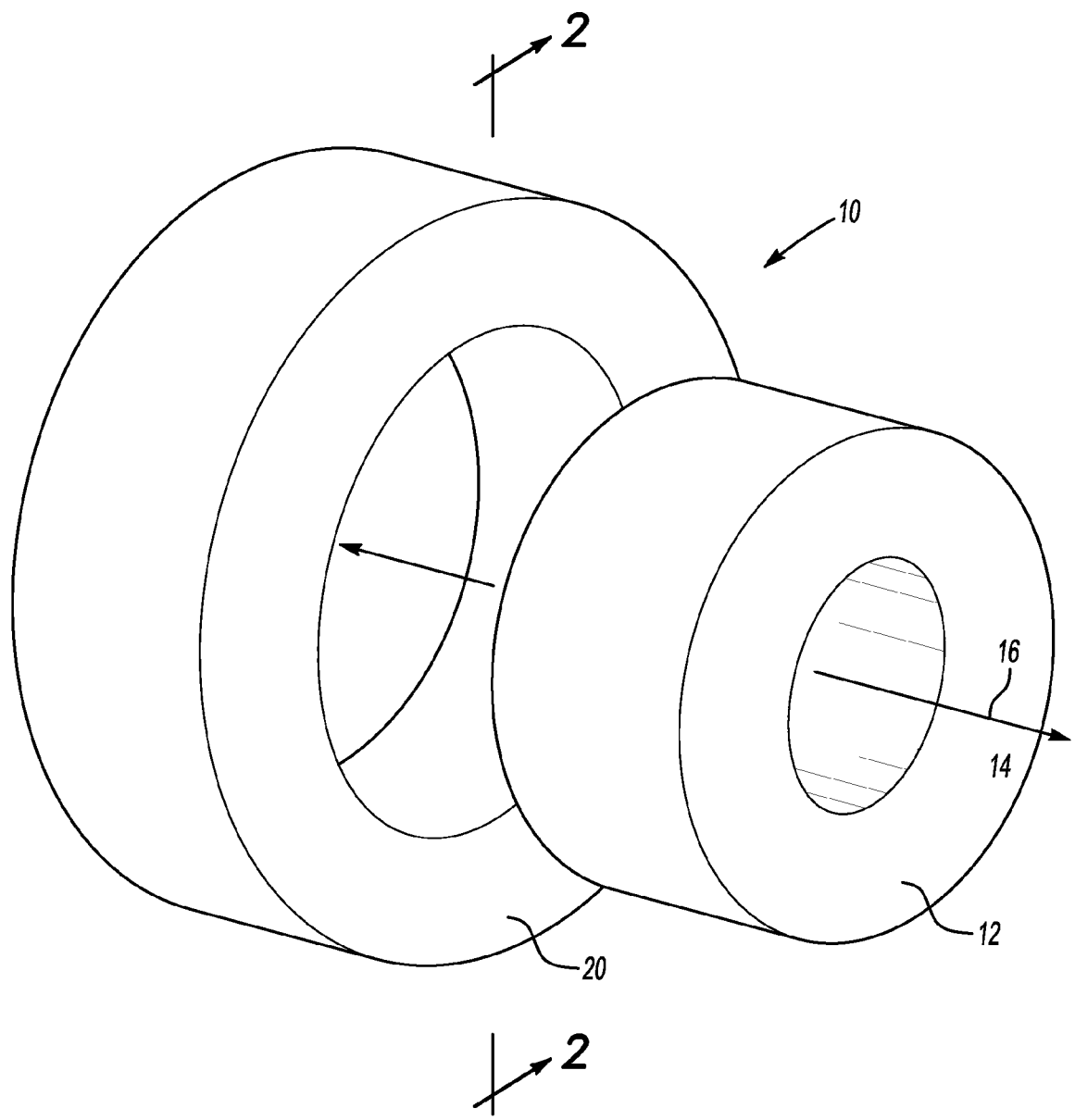
FIG. 1 is a perspective view of an exemplary embodiment of the invention.

It can be desirable to manufacture components as composites of multiple materials. Each material can be chosen for one or more specific mechanical properties. Composites can have a higher strength to weight ratio than metallic components.

It can also be desirable to form components integrally, such that structures serving different functional purposes are formed at the same time and are fixed together. An integrally-formed composite component can include a primary portion that serves one or more purposes and a mounting portion for attaching the primary portion to another structure. For example, a composite engine casing for a turbine engine can be a primary portion of a component and a circumferential flange can be a mounting portion of the component. The engine casing and the circumferential flange can be formed at one time and be integral with one another.

While composite components can be designed to have sufficient strength in one direction or plane, these structures may exhibit less than adequate strength in another direction or plane. For example, a cylindrical composite structure can be designed to have sufficient hoop strength, but a circumferential flange that is incorporated with the cylindrical structure can be crushed when subjected to a compression load, such as when the circumferential flange is bolted to other structures.

Creep is another problem associated with mounting portions of composite structures. Creep is the relatively slow and permanent deformation of a structure in response to stress. It can occur as a result of long term exposure to levels of stress that are below the yield strength of the material. Creep is more severe in materials that are subjected to heat for long periods, and near the melting point. The extent of creep generally increases with temperature. In turbine engines, temperatures can reach up to 1400° C. (2550° F.). The rate of creep deformation is a function of the material properties, exposure time, exposure temperature and the applied structural load. Depending on the magnitude of the applied stress and its duration, the deformation may become large enough such that the component can no longer perform its function.

A spacer is a structure for bearing compression loads. For example, a spacer can be mounted in an aperture of a first component. Compression loads associated with attaching the first component to some other structure can be born by the spacer to limit compressive deformation of the first component. The spacer may fully bear the compression load such that the first component is completely shielded from compression loads. Alternatively, the spacer may bear a portion of the compression load such that the first component experiences a portion of the compression load. The first component may or may not compress (deform) in response to the compression load.

A spacer can be a sleeve-like structure that is mounted in an aperture of a composite circumferential flange. A fastener such as bolt can extend through the spacer and be tightened to attach the flange to another structure, such as a frame. The bolt can exert a compression load on the spacer and the frame; the circumferential flange can be fully or at least partially isolated from the compression load.

Referring now to FIG. 1, a composite spacer 10 according to an embodiment of the invention is operable to be mounted on a first component and bear compression loads associated with attaching the first component to some other structure. Compression loads are born by the composite spacer 10 to limit or prevent compressive deformation of the first component.

The composite spacer 10 includes a first body 12 formed of resin and defining an aperture 14 extending along an axis 16. The resin of the first body 12 can be selected in view of the operating environment of the composite spacer 12. The resin of the first body 12 can be an epoxy resin, a bismaleimide (BMI) resin, or an in situ Polymerisation of Monomer Reactants (PMR) resin. BMI resins are polyimides and can be useful in high-performance structural composites that require superior toughness and temperature resistance up to around 473° F. PMR resins can be applied in especially high-temperature operating environments, having temperature resistance up to 700° F.

Figure 2:
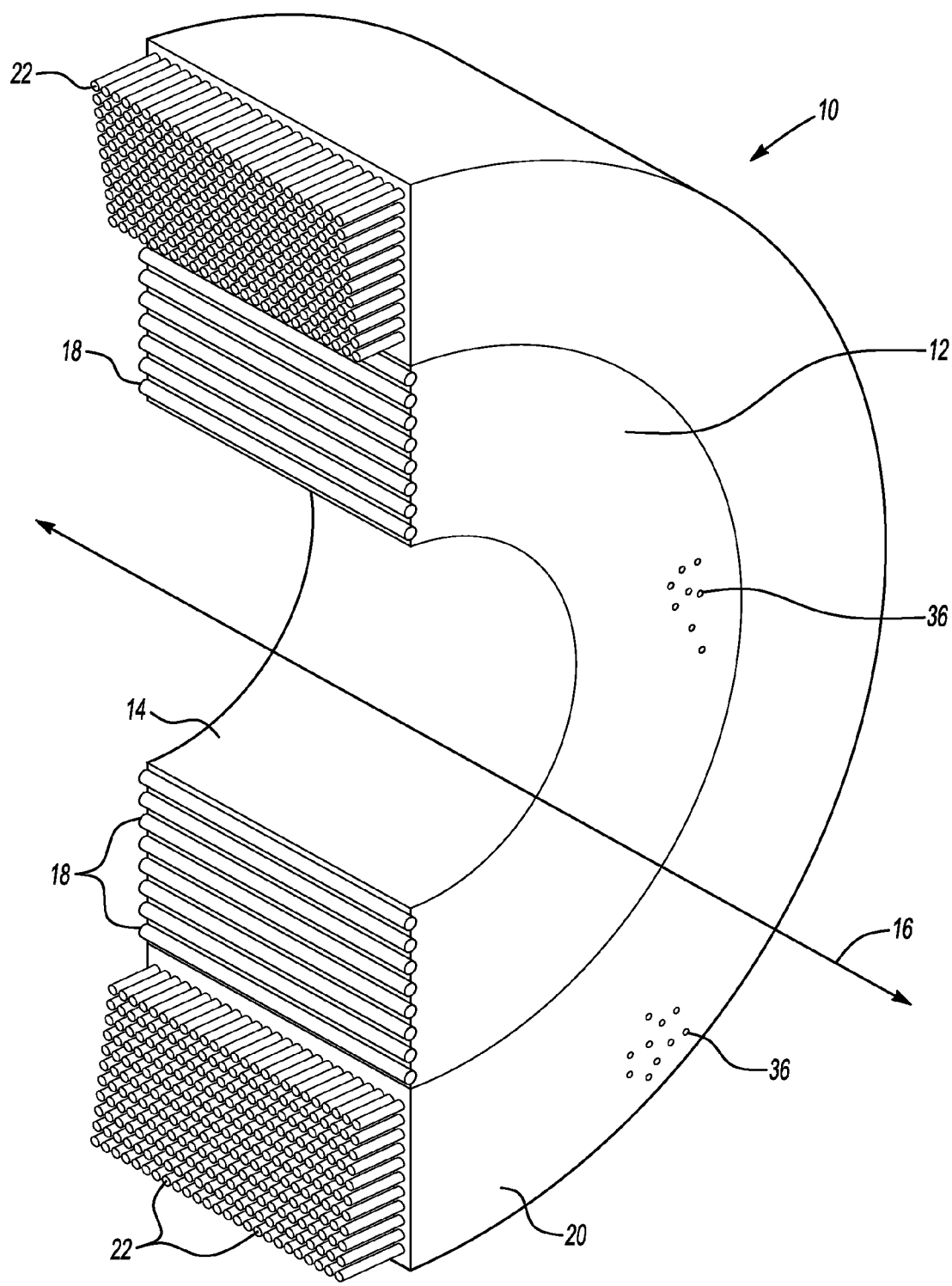
FIG. 2 is a cross-section taken through section lines 2-2 in FIG. 1.

Referring now to FIG. 2, the composite spacer 10 also includes a plurality of first fibers 18 positioned in the first body 12 about the aperture 14. It is noted that not all of the first fibers 18 shown in FIG. 2 are numbered to maintain clarity in the drawing. Each of the first fibers 18 extends substantially parallel to the axis 16 and increases a compressive strength of the first body 12 relative to the axial direction. The material (compound or element) for the fibers 18 can be selected in view of the operating environment of the composite spacer 10, including the compression load to be applied to the composite spacer 10. The material for the fibers 18 can be selected for high resistance to compression loading, such as loading tending to cause compression (deformation). In the exemplary embodiment, the first fibers 18 can be boron fibers, generally 0.004 inch in diameter. The first fibers 18 can be arranged radially spaced from one another and/or circumferentially spaced from one another. In the exemplary embodiment, the fibers 18 can be both radially and circumferentially spaced from one another.

The first fibers 18 can make up substantially forty to sixty percent of the structure defined by the combined first fibers 18 and first body 12 by volume. In the exemplary embodiment of the invention, the first fibers 18 can make up substantially fifty percent of the volume of the structure. Above sixty percent, the resin may not be able to adequately enrobe the fibers and voids could occur. However, if voids can be avoided, the volume of the fibers relative to the resin may be higher than sixty percent. Below forty percent, the compressive strength of the combined first fibers 18 and first body 12 may not sufficient. However, if adequate compressive strength can be obtained, the volume of the fibers relative to the resin may be lower than forty percent.

The composite spacer 10 can also include a second body 20 encircling the first body 12 about the axis 16. A hoop strength of the second body 20 supports the first body 12 in maintaining an orientation of the plurality of first fibers 18. Generally, the second body 20 can support the resin of the first body 12 and can prevent the first body 12 from rupturing.

The second body 20 can be formed from any material or combination of materials in view of operating conditions. The exemplary second body 20 can be formed from resin. The resin of the second body 20 can be selected in view of the operating environment of the composite spacer 12. The resin of the second body 20 can be an epoxy resin, a BMI resin, or a PMR resin. The resin of the second body 20 can be the same as the resin of the first body 12 or a different resin.

The exemplary composite spacer 10 can also include a plurality of second fibers 22 positioned in the second body 20. It is noted that not all of the second fibers 22 shown in FIG. 2 are numbered to maintain clarity in the drawing. The second fibers 22 can extend circumferentially about the first body 12. Thus, the first plurality of fibers 18 and the second plurality of fibers 22 are transverse to one another. The second fibers 22 can enhance the hoop strength of the second body 20.

The material (compound or element) for the fibers 22 can be selected in view of the operating environment of the composite spacer 10, including the extent of loads directed radially outward when the first body 12 and fibers 18 are subjected to a compression load along the axis 16. The material for the fibers 22 can be selected for high resistance to tensile loading. In the exemplary embodiment, the second fibers 22 can be carbon fibers, generally 0.0005 inch in diameter. In alternative embodiments of the invention, the second fibers 22 could be glass, basalt or some other material. The second fibers 22 can be arranged radially spaced from one another and/or axially spaced from one another. In the exemplary embodiment, the second fibers 22 can be both radially and axially spaced from one another.

The first body 12 and the second body 20 can be fixed together using adhesive. Nanoglue can be applied to fix the first and second bodies 12, 20 together. Nanoglue was developed by researchers at Rensselaer Polytechnic Institute and can bond materials that don't normally adhere to one another. Nanoglue is based on self-assembling nanoscale chains less than a nanometer thick. Nanoglue is commercially available and recent developments have occurred in which the adhesive capabilities can be enhanced. Nanoglue can define a bond between two structures, such as the bodies 12 and 20, that strengthens as temperature increases. Other forms of adhesive can be applied as desired. Alternatively, the first and second bodies 12, 20 can be heated to partially melt and fuse the resin(s) of the first and second bodies 12, 20.

The composite spacer 10 can also include carbon nanotubes 36. A quantity of carbon nanotubes 36 can be dispersed throughout the first body 12. The carbon nanotubes 36 can enhance the compressive strength of the first body 12. A second quantity of carbon nanotubes 36 can be dispersed throughout the second body 20. The carbon nanotubes 36 in the second body 20 can enhance the hoop strength of the second body 12. In FIG. 2, only a relatively small number of carbon nanotubes 36 are shown clustered together to enhance the clarity of the drawing. However, the respective bodies 12 and 20 can contain any quantity of carbon nanotubes 36 and the carbon nanotubes 36 can be evenly dispersed.

Figure 3:
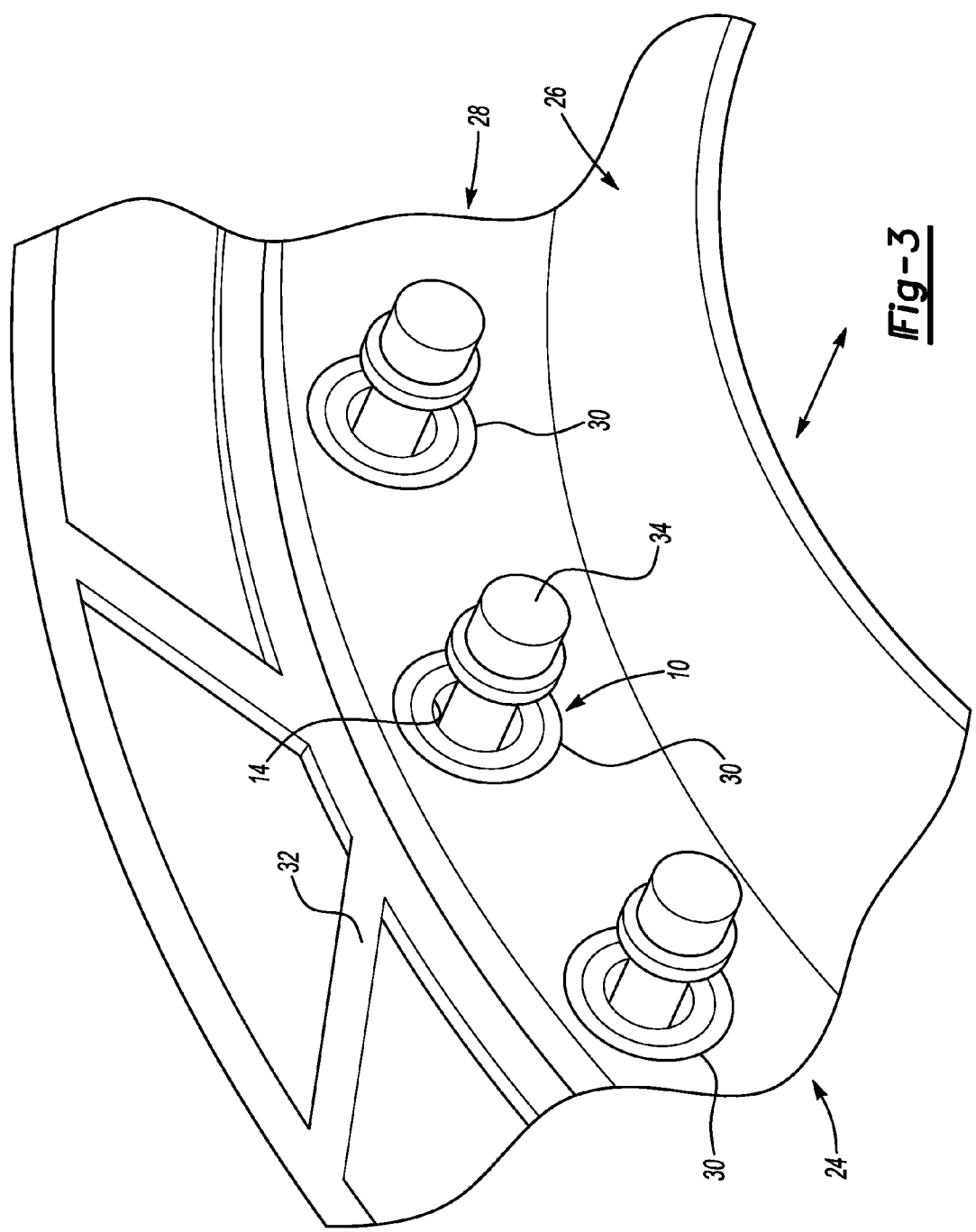
FIG. 3 is a perspective view of an assembly incorporating the exemplary embodiment of the invention.

Referring now to FIG. 3, the composite spacer 10 can be used in combination with a component 24 having a primary portion 26 and a mounting portion 28 integrally formed with respect to one another. In alternative embodiments of the invention, the primary portion and the mounting portion can be separately formed and joined together. The exemplary primary portion 26 can be a cylinder-like casing for a turbine engine. The exemplary primary portion 26 can perform the function of enclosing at least part of a turbine engine, among other functions. The exemplary primary portion 26 can experience forces directed radially-outward resulting from internal pressure, as well as other forces. The invention can also be practiced in other operating environments such as automotive, marine, and non-vehicular.

The exemplary mounting portion 28 can be a circumferential flange. The mounting portion 28 can include one or more apertures 30 for attaching the primary portion 26 to another structure, such as a frame member 32 of an aircraft. It is noted that alternative embodiments of the invention can be practiced in other technological fields. A composite spacer 10 can be received in each aperture 30 defined by the mounting portion 28. The composite spacer 10 can be bonded to the aperture 30 with nanoglue. Alternatively, the composite spacer 10 can be bonded to the aperture 30 by heating and at least partially melting the resin of the spacer 10 and the resin of the mounting portion 28.

The component 24 can be formed from resin and a plurality of fibers embedded in the resin. The fibers in the component 24 can optimize the tensile strength of the primary portion 26 over the compressive strength. For example, the material of the fibers in the component 24 can be selected for superior tensile properties to optimize the hoop strength of the primary portion 26. Also, the orientation of fibers (such as a 0°, 90°, +45°, −45° layup for example) can be selected to enhance the tensile strength of the primary portion 26. The material selection for the fibers and the arrangement of the fibers in the mounting portion 28 can be a secondary design consideration relative to those same determinations in the design of the primary portion 26.

The maximum compression load can be directed at the mounting portion 28 when the component 24 is mounted to another structure, such as a frame or another similar component. The mounting portion 28 can also be subject to other loading. For example, if the component 24 is a turbine engine casing associated with a vehicle, the mounting portion 24 may be subjected to significant shifting as the vehicle moves during operation. The mounting portion 28 can be the life-limiting structure of component 24 in view of the loading that occurs during operation.

During assembly, the aperture 14 of the composite spacer 10 can be aligned with an aperture (not visible) of the frame member 32 to attach the component 24 to the frame member 32 (or second component). A fastener such as a bolt 34 can be received in the aperture 14 and in the aperture of the frame member 32. The bolt 34 can be subjected to torque and tightened, resulting in a compression load applied to the composite spacer 10 and the frame member 32. The composite spacer 10 can be designed to partially or fully shield the mounting portion 28 from bearing any of the compression load. In the exemplary embodiment of the invention, the compressive strength of the inner ring could be in the range of 210,000 psi. This strength is on par with traditional steel or nickel and perhaps titanium yet stronger than aluminum or magnesium. The design of the composite spacer 10 can be adjusted to vary the extent of compression load experienced by the mounting portion 28 by changing the axial length of the composite spacer 10, the number of fibers 18 (shown in FIG. 2), the material of the fibers 18, or by changing other design parameters.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An assembly comprising:
   an annular casing for a turbine engine with an integrally formed flange having a first aperture extending along an axis and formed from a first resin and a plurality of first fibers embedded in said first resin, said flange defining a mounting portion of said annular casing, wherein said plurality of first fibers have greater tensile strength than compressive strength; and
   a composite spacer positioned in said first aperture, said spacer having:
   a first body formed of a second resin and defining a second aperture extending along said axis and also having a plurality of second fibers positioned in said first body about said aperture, each of said second fibers extending substantially parallel to said axis and increasing a compressive strength of said first body relative to the axial direction;
   a second body encircling said first body about said axis, wherein the hoop strength of said second body supports said first body in maintaining an orientation of said plurality of first fibers, wherein said first body and said second body are fixed together with nanoglue and wherein said second body and said flange are fixed together with nanoglue.

2. The assembly of claim 1 further comprising:
   carbon nanotubes dispersed throughout said first and second bodies.

\* \* \* \* \*